United States Patent [19]

Yoshikawa et al.

[11] Patent Number: 4,745,588
[45] Date of Patent: May 17, 1988

[54] TRACKING CONTROL APPARATUS

[75] Inventors: Shozi Yoshikawa; Masanori Doi, both of Tokyo, Japan

[73] Assignee: Olympus Optical Co., Ltd., Tokyo, Japan

[21] Appl. No.: 849,053

[22] Filed: Apr. 7, 1986

[30] Foreign Application Priority Data

Apr. 16, 1985 [JP] Japan .................................. 60-81149
May 13, 1985 [JP] Japan ................................. 60-100986

[51] Int. Cl.⁴ .................... G11B 17/00; G11B 7/00; G11B 21/10
[52] U.S. Cl. ........................ 369/32; 360/77; 369/44
[58] Field of Search .............. 369/32, 43, 44, 46, 369/33; 360/77, 78

[56] References Cited

U.S. PATENT DOCUMENTS

| | | | |
|---|---|---|---|
| 4,488,276 | 12/1984 | Tanaka | 369/46 |
| 4,497,048 | 1/1985 | Konura | 369/46 |
| 4,544,872 | 10/1985 | Hirano et al. | 369/46 |
| 4,581,728 | 4/1986 | Nakamura et al. | 369/46 |
| 4,630,250 | 12/1986 | Nonomura | 369/44 |
| 4,630,252 | 12/1986 | Miura et al. | 369/44 |

Primary Examiner—Steven L. Stephan
Attorney, Agent, or Firm—Frishauf, Holtz, Goodman & Woodward

[57] ABSTRACT

An apparatus for controlling the tracking of an optical disk by moving an objective lens and a carriage supporting the objective lens. The apparatus comprises a lens tracking mechanism comprising an actuator and a lens tracking circuit, and an equivalent circuit having the same response characteristic as the lens tracking mechanism. The lens tracking mechanism moves the lens in real time in the radial direction of the disk in accordance with a tracking error signal representing the distance between a laser beam spot and a target track. The carriage is moved also in the radial direction of the disk in accordance with a sine-wave signal approximating the eccentricity of the disk. The eccentricity has been detected from the distance over which the lens is moved when the carriage is not moved. This distance is not detected by measuring, but obtained from the output signal which the equivalent circuit generates in response to the tracking error signal.

19 Claims, 6 Drawing Sheets

TRACKING CONTROL APPARATUS

BACKGROUND OF THE INVENTION

The present invention relates to an apparatus for recording data on and reproducing data from, a recording medium having concentric tracks or a spiral track, and more particularly to an apparatus for controlling the tracking of the recording medium.

Recently various apparatuses for optically recording data on and reproducing data from, a disk-shaped recording medium such as an optical disk have been proposed. To record or reproduce data, the disk-shaped recording medium is spinned, and a laser beam is applied to the concentric track or spiral track of the spinning recording medium. The thinner the beam, the higher the recording density of the medium. The recording density is high since the laser beam has a small diameter. The pitch, at which the concentric tracks or the turns of the spiral track are arranged, is only a few microns. Due to the changes of the manufacture conditions of the disk-shaped recording medium, e.g., changes in the press force, the tracks are not perfectly concentric or not perfectly spiral. Further, the center hole of the medium, into which the center spindle of the apparatus is inserted, may not be completely concentric, or the shaft of the motor for spinning the medium may not be coaxial with the medium. Hence, the tracking of the medium must be accurately achieved to record or reproduce data. In other words, the laser beam spot must be accurately moved in the radial direction of the medium to a target concentric track or a target turn of the spiral track.

A tracking control apparatus with a two-stage servo, closed loop control system is known. It performs the so-called tracking control (hereinafter called "lens tracking") achieved by moving the objective lens or mirror provided in an optical pickup. It performs also the so-called access control (hereinafter called "carriage tracking") effected by moving a carriage and, thus, moving the pickup mounted on the carriage. The beam reflected from an optical disk is detected by a photo-detector and converted into a tracking error signal which represents the distance between the beam spot and the target track. The tracking error signal is supplied to a lens tracking circuit and a carriage tracking circuit. The lens tracking circuit drives an actuator. The actuator move the lens in the radial direction of the disk until the tracking error signal falls to zero level. The carriage tracking circuit drives a voice coil motor or the like which in turn moves the carriage in the radial direction of the disk until the tracking error signal falls to zero level.

The tracking control apparatus has the drawback that the closed loop control system is complicated and expensive. Since the lens tracking circuit quickly responds to the high-frequency tracking error whereas the carriage tracking circuit quickly responds to the low-frequency tracking error but slowly responds to the high-frequency tracking error due to the weight of the carriage, complicated circuits must be used to compensate for this difference in frequency characteristic between the two tracking circuits.

The tracking control apparatus has the other drawback that the control signal undergoes a phase delay inevitably due to the response delay of the carriage. To avoid this delay, a mechanism which can quickly move the carriage must be used. Such a mechanism is expensive.

SUMMARY OF THE INVENTION

Accordingly, the object of the present invention is to provide a tracking control apparatus of a simple structure which can accurately control the tracking of a recording medium having concentric tracks or a spiral track to record data on, and reproduce data from, the recording medium.

According to the invention, there is provided a tracking control apparatus comprising a first signal generator for generating a periodic signal, a second signal generator for generating a signal representing an eccentricity of a recording medium, a controller for controlling a phase of the periodic signal output from the first signal generator in accordance with the output signal of the second signal generator, and a tracking circuit for controlling the tracking of the recording medium in accordance with the periodic signal whose phase has been controlled by the controller.

BRIEF DESCRIPTION OF THE DRAWINGS

FIGS. 4A–4I show the waveforms of the signals used in the apparatus shown in FIG. 1;

FIGS. 6A–6G show the waveforms of the signals used in the apparatus shown in FIG. 5.

DETAILED DESCRIPTION OF THE PREFERRED EMBODIMENTS

A first embodiment of the invention will be explained with reference to the drawings attached hereto. This embodiment is an apparatus designed to control the tracking of an optical disk. More specifically, the apparatus moves a carriage to perform a coarse tracking, and moves an objective lens to effect a minute tracking.

The carriage is not moved in response to a tracking error signal in real time, coarsely tracking the disk. Rather, it is moved by a sine-wave drive signal for approximating the eccentricity of the optical disk. This is so because the eccentricity of the track can be given by a sine-wave. The lens is moved in real time by the tracking error signal, thus minutely tracking the disk.

The eccentricity of the optical disk is determined in the following manner. The lens tracking is carried out before the two-stage servo tracking. The carriage is not moved during the lens tracking. Therefore, the moving distance of the objective lens is equivalent to the eccentricity of the optical disk. This distance is detected not by actually measuring it; it is detected from an output which an equivalent circuit having the same response characteristic as the lens tracking unit (including an actuator, a lens tracking circuit, etc.) produces upon receiving the tracking error signal.

Figure 1:
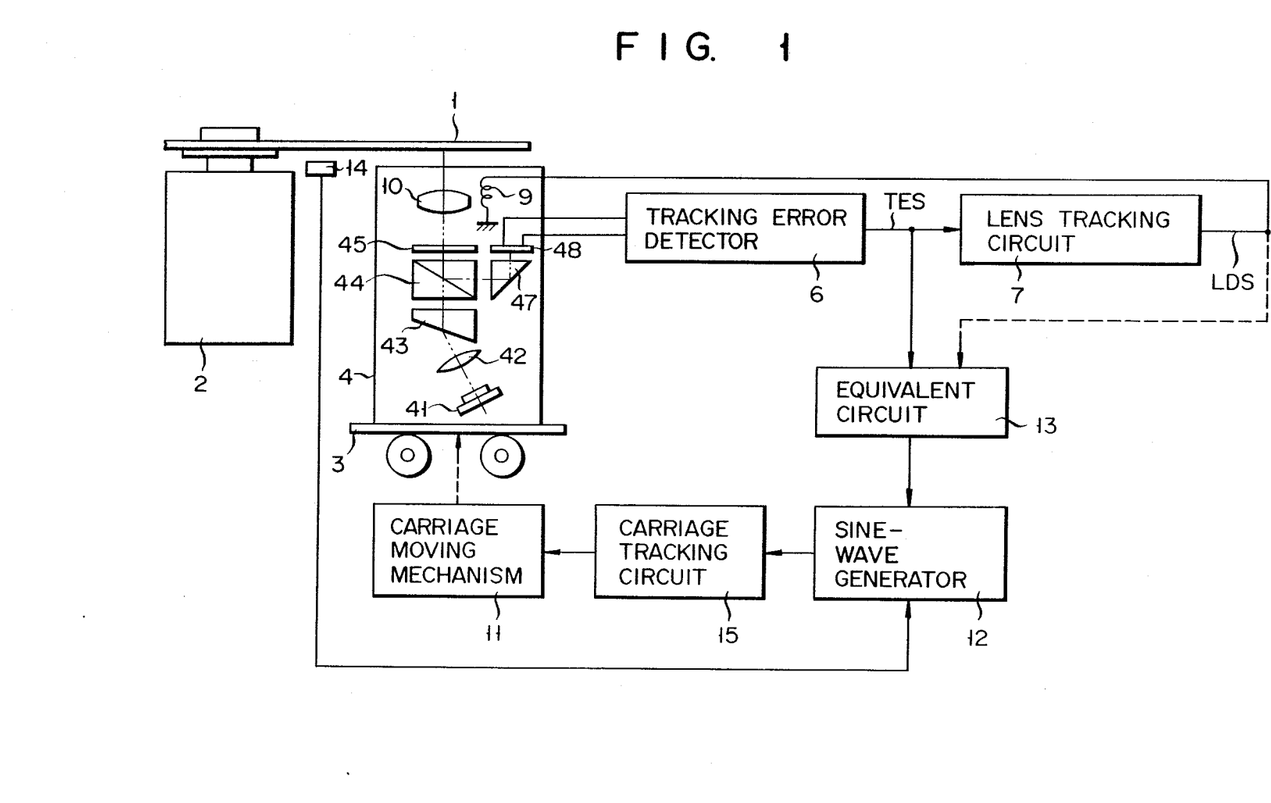
FIG. 1 is a block diagram of a tracking control apparatus according to the invention.

FIG. 1 is a block diagram of the first embodiment. Optical disk 1 is spinned by a spindle motor 2 at a constant speed. Concentric tracks are formed on the lower side of disk 1. Carriage 3 is provided below optical disk 1, and optical pickup 4 is mounted on carriage 3.

As shown in FIG. 1, optical pickup 4 comprises actuator 9, objective lens 10, semiconductor laser 41, collimator lens 42, beam-shaping prism 43, polarizing prisms 44, quarter-wave plate 45, total reflecting prism 47 and a photodetector 48. Laser 41 emits a laser beam. The beam is supplied through lens 42, prisms 43 and 44, plate 45 and lens 10 to disk 1. The light reflected from disk 1 is supplied to polarizing prism 44 through objective lens 10 and quarter wave plate 45. Prism 44 reflects the light by 90°, and the light is supplied to photodetector 48 through totally reflecting prism 47.

Photodetector 48 has a light-receiving surface equally divided into two segments along the track direction. The light-receiving segments generate differential signals. Those signals are supplied to tracking error detector 6. Detector 6 generates a tracking error signal TES representing the distance between the beam spot and a target track.

Tracking error signal TES is input to lens tracking circuit 7 whose output, lens driving signal LDS is then supplied to actuator 9. Actuator 9 moves objective lens 10 in the radial direction of optical disk 1, thereby tracing the beam spot on the target track and thus accomplishing an accurate tracking of disk 1. Actuator 9 comprises a magnet and a coil. It can perform not only radial servo, i.e., moving lens 10 in the radial direction of disk 1, but also focus servo, i.e., moving lens 10 in the axial direction of disk 1.

Carriage 3 is moved by carriage driving mechanism 11 (i.e., an α-belt) in the radial direction of optical disk 1 to carry out the coarse tracking. Tracking error signal TES is also supplied to sine-wave generator 12 through equivalent circuit 13. Circuit 13 has the same response characteristic as the unit consisting of lens tracking circuit 7 and actuator 9. The distance by which lens 10 has been moved, i.e., the eccentricity of optical disk 1, can be calculated from the output which circuit 13 produces upon receipt of tracking error signal TES. A sine-wave signal from generator 12 is supplied to carriage tracking circuit 15 whose output is then supplied to carriage moving mechanism 11.

It suffices for equivalent circuit 13 to have a response characteristic identical with that of actuator 9. In this case, lens driving signal LDS output by circuit 7 is fed to circuit 13. Thus, the eccentricity of disk 1 can also be obtained from signal LDS. Circuit 13 need not have a frequency response characteristic identical with that of the unit consisting of circuit 7 and actuator 9; it can be a low-pass filter.

Sine-wave generator 12 generates a sine-wave signal corresponding to the output signal which circuit 13 produces when only objective lens 10 is moved. The sine-wave signal is supplied to circuit 15 when carriage tracking is performed in addition to lens tracking. The phase of the sine-wave signal is controlled in synchronism with the rotation of disk 1, and the amplitude of the signal is controlled by the eccentricity of disk 1.

Figure 2:
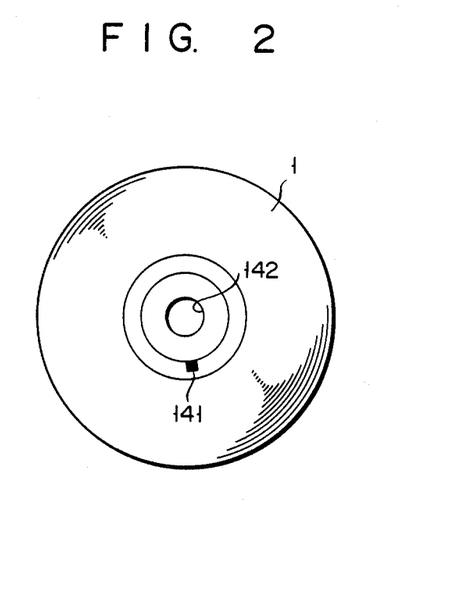
FIG. 2 is a plan view of a recording medium.

As illustrated in FIG. 2, optical disk 1 has an index mark 141 on the innermost track. Mark 141 has a reflectivity or transparency different from that of disk 1. Alternatively, mark 141 can be made of a material different from that of disk 1, such as magnetic material. Disk 1 has a spindle hole 142. Index mark 141 is detected by index mark detector 14. Hence, detector 14 generates one index pulse every time disk 1 rotates 360°. The index pulse is supplied to sine-wave generator 12 to control the phase of the sine-wave signal.

Figure 3:
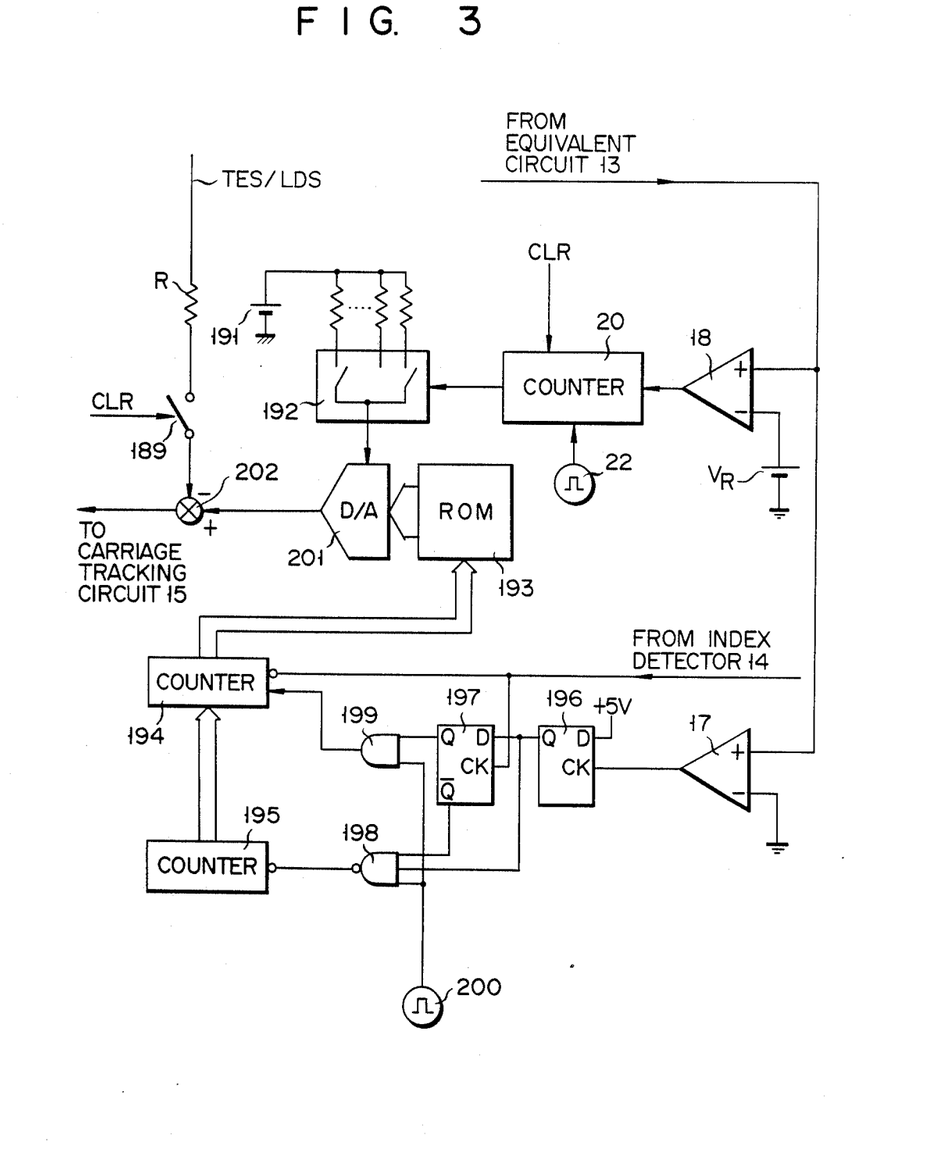
FIG. 3 is a circuit diagram of the sine-wave signal generator used in the apparatus of FIG. 1.

Sine-wave generator 12 has the structure shown in FIG. 3. The data representing the sine waveform is stored in ROM (read only memory) 193. More precisely, 256 items of data representing a sine wave of one-cycle are sequentially stored in ROM 193. The output of equivalent circuit 13 is supplied to zero-crossing detector 17 and the positive (+) input terminal of comparator 18. The negative (−) input terminal of comparator 18 is connected to reference power source $V_R$. Zero-crossing detector 17 sets the reference for the phase control of the sine wave read from ROM 193, and comparator 18 controls the amplitude of the sine wave.

The output of comparator 18 is supplied to the enable terminal of a counter 20. Counter 20 counts clock pulses 22 as long as the output of comparator 18 remains at high level. Clear signal CLR is fed to the clear terminal of counter 20 from a controller (not shown). The output of counter 20 is supplied to the control terminal of multiplexer 192. Multiplexer 192 selects one of the resistors coupled to reference voltage generator 191, thereby producing a signal at the level corresponding to the output of counter 20. The output signal of multiplexer 192 is supplied to the analog input terminal of D/A converter 201. D/A converter 201 multiplies the converted analog data by the multiplier supplied to the analog input terminal, i.e., the output signal of multiplexer 192. Converter 201 is MC1408 or MC1508, either being the multiplying D/A converter manufactured by Motorola, Inc. D/A converter 201, therefore, controls the amplitude of the sine-wave signal in accordance with the output of equivalent circuit 13.

The output of D/A converter 201 is input to the positive (+) input terminal of adder 202. Tracking error signal TES or lens driving signal LDS is supplied to the negative (−) input terminal of adder 202 through resistor R and switch 189. Clear signal CLR is supplied to the control terminal of switch 189 from the controller (not shown), to close or open switch 189. The output of adder 202, which represents the sine waveform, is supplied to carriage tracking circuit 15.

As mentioned above, the 256 items of data of the sine wave of one cycle are stored in the consecutive addresses of ROM 193. The read address signals for designating the addresses are controlled in the following way to read the sine-wave data in synchronism with the rotation of optical disk 1. First, the output of zero-crossing detector 17 is input to clock terminal CK of D flip-flop (D-FF) 196. Input terminal D of D-FF 196 is connected to a power source of +5 V. Therefore, once D-FF 196 is set, it remains so until it is reset. The reset terminal of D-FF 196 is not shown. Output terminal Q of D-FF 196 is connected to input terminal D of D-FF 197 and also to one input terminal of AND gate 198. The index pulse output by index detector 14 is input to clock terminal CK of D-FF 197. Output terminal Q of D-FF 197 is coupled to one input terminal of AND gate 199. Output terminal $\overline{Q}$ of D-FF 197 is connected to another input terminal of AND gate 198. Clock pulse 200 is supplied to the other input of AND gate 198 and also to the other input of AND gate 199. Pulse 200 is generated every time disk 1 rotates 360°/265. The output of AND gate 198 is input to the clock terminal of counter 195. Counter 195 detects the period (phase difference) between the detection of a zero-crossing point and the detection of index mark 141.

The output of AND gate 199 is input to the clock index terminal of counter 194. The index pulse from index detector 14 is input to the preset terminal of counter 194. The count of counter 195 is preset to counter 194. Counter 194 counts clock pulses 200 supplied from AND gate 199. Its count is supplied as a read address signal to ROM 193. The preset value of counter 194 is the period (phase difference) between the detection of a zero-crossing point and the detection of index mark 141. Hence, the sine-wave data can be read from ROM 194, beginning with the segment of the wave data corresponding to the phase difference, whereby the sine-wave signal is generated in synchronism with the rotation of optical disk 1.

The operation of the first embodiment will now be explained with reference to FIGS. 4A–4I showing the waveforms of the various signals used in the apparatus.

Figure 4A:
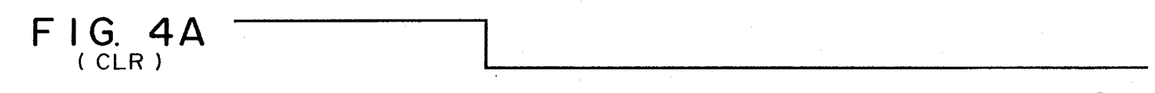

Prior to the two-stage servo tracking, only the lens tracking is performed to detect the eccentricity of disk 1. First, clear signal CLR is set to high level as shown in FIG. 4A, whereby the level of the output of counter 20 falls to zero level. All switches of multiplexer 192 are opened, changing the multiplier of D/A converter 201 to zero, and D/A converter 201 outputs zero-level signals, regardless of the sine-wave data.

Figure 4B:
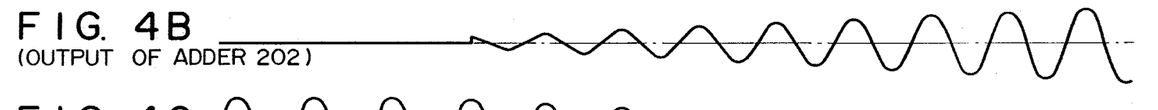
Figure 4C:
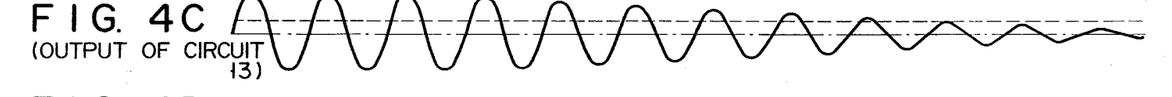

Clear signal CLR at high level also opens switch 189, whereby the output of adder 202 falls to zero level as shown in FIG. 4B. Therefore, no carriage tracking is effected. Only lens 10 is moved in accordance with tracking error signal TES to compensate for the eccentricity of the tracks. The output of circuit 13 becomes a sine-wave signal which has almost constant frequency and amplitude as shown in FIG. 4C. One-cycle period of this signal corresponds to one full rotation of disk 1.

Thereafter, the carriage tracking is started. To effect the two-stage servo tracking, the level of clear signal CLR is changed to low level as shown in FIG. 4A. A multiplier other than zero is set to D/A converter 201. D/A converter 201 multiplies the sine-wave signal output from ROM 193. The output of converter 201 is supplied to adder 202. Adder 202 takes signal TES from the output of converter 201. Its output, which is shown in FIG. 4B, is input to carriage tracking circuit 15. Carriage 3 is, therefore, moved to compensate for the eccentrictiy of disk 1. As a result, objective lens 10 is moved less, and the amplitude of the sine-wave output signal of equivalent circuit 13 gradually decreases as shown in FIG. 4C.

Figure 4D:
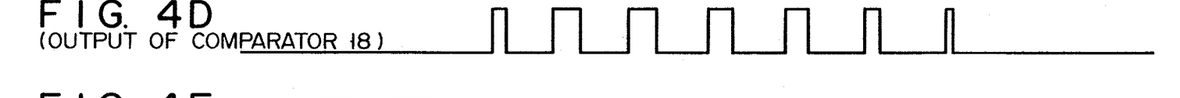

The amplitude of the sine-wave signal, which represents the eccentricity of disk 1 and is supplied from ROM 193 to carriage tracking circuit 15 through adder 202, is controlled in the following way. Comparator 18 compares the sine-wave signal from equivalent circuit 13 with reference value $V_R$ shown by the broken line in FIG. 4C. As long as the signal is at any level above value $V_R$, comparator 18 produces a pulse signal (FIG. 4D). The pulse signal is supplied to counter 20. Counter 20 counts clock pulses 22 only while it is receiving the pulse signal from comparator 18. Hence, the count of counter 20 increases at a decreasing rate.

Multiplexer 192 sets a multiplier to D/A converter 201, the multiplier corresponding to the count of counter 20. The multiplier, therefore, increases from zero. The amplitude of the sine-wave signal output from D/A converter 201 increases from zero, and so does the amplitude of the sine-wave signal (FIG. 4B) output from adder 202. As the two-stage servo tracking proceeds, tracking error signal TES attenuates, and the amplitude of the sine-wave signal (FIG. 4C) output from equivalent circuit 13 gradually decreases. When the amplitude of the sine-wave signal from circuit 13 decreases below reference value $V_R$, the output of comparator 18 falls to low level, whereby counter 20 stops.

The amplitude of the sine-wave signal output from D/A converter 201 no longer increases.

The phase of the sine-wave signal output from ROM 193 is controlled in the following way. When clear signal CLR (FIG. 4A) is lowered to low level to start the two-stage servo tracking, D/A converter 201 starts functioning. The sine-wave signal representing the eccentricity of disk 1 and read from ROM 193 by using the count of counter 194 as an address signal is input to carriage tracking circuit 15. Since ROM 193 stores 256 items of sine-wave data of sin $\alpha$ ($\alpha$ ranging from 0° to 360°) in the consecutive addresses, the addresses must be controlled as disk 1 spins. In other words, the phase of the sine-wave signal read from ROM 193 must be synchronized with the rotation of disk 1.

Index detector 14 detects one index every time disk 1 rotates through 360°. However, the index pulse cannot serve to synchronize the phase of the signal read from ROM 193 with the rotation of optical disk 1 since the phase angle of the eccentricity of the disk of that portion corresponding to the index mark is different from disk to disk. A specific phase of the sine-wave signal must be synchronized with the time of generating the index pulse.

Figures 4E, 4F:
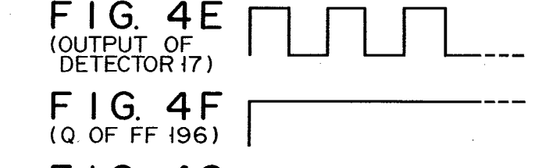

For this purpose, the zero-crossing point of the sine-wave signal output from equivalent circuit 13 is detected, and the time-lag between the zero-crossing point and the time of generating the index pulse is detected. More precisely, the output of circuit 13 is supplied to zero-crossing detector 17, and detector 17 generates the rectangle-wave signal shown in FIG. 4E. D-FF 196 is set at the leading edge of the rectangle-wave signal, whereby the Q output of D-FF 196 rises to high level as shown in FIG. 4F. Since input terminal D of D-FF 196 is connected to the power source (+5 V), the Q output remains at high level even if the output signal of zero-crossing detector 17 falls to low level.

Figure 4G:
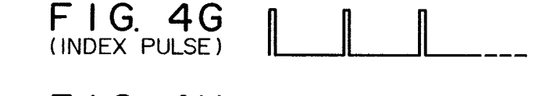
Figure 4H:
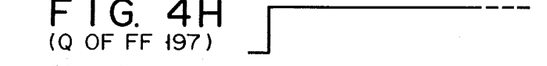
Figure 4I:
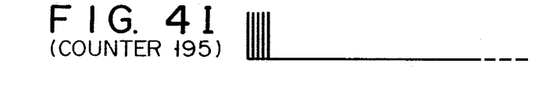

As shown in FIG. 4G, index detector 14 generates one index pulse for each cycle of the sine-wave signal output from equivalent circuit 13. D-FF 197 is set by the first index pulse generated after the Q output of D-FF 196 has risen to high level. Simultaneously, the Q output of D-FF 197 rises to high level as shown in FIG. 4H, and the $\overline{Q}$ output of D-FF 197 falls to low level. AND gate 198 opens when the Q output of D-FF 196 rises to high level and closes when the $\overline{Q}$ output of D-FF 197 rises to high level. While it is open, AND gate 198 supplies clock pulses 200 to counter 195. Therefore, counter 195 detects the period between the detecting of the zero-crossing point and the producing of the index pulse. This period corresponds to that initial phase of the sine-wave signal output from ROM 193.

The output of counter 195 is preset to counter 194 every time the index pulse is generated to avoid the accumulation of control errors. Counter 194 counts the clock pulses 200 output from AND gate 199. AND gate 199 outputs 256 clock pulses at each rotation of disk 1 and, hence, for every one-cycle period of the output of equivalent circuit 13. ROM 193 can supply a sine-wave signal approximating the eccentricity of disk 1, in synchronism with the rotation of disk 1 since each read address signal is supplied to ROM 193 in accordance with the count of counter 194.

Tracking error signal TES is subtracted from the sine-wave signal whose phase and amplitude have been controlled, thereby forming a signal. This signal is supplied to carriage tracking circuit 15 to maintain objective lens 10 at the mechanical center. Lens 10 returns to the mechanical center when carriage 3 is moved in accordance with signal TES.

In the embodiment described above, the tracking of optical disk 1 is effected in two steps, i.e., first by moving objective lens 10, and then by moving carriage 3. Carriage 3 is moved by a sine-wave drive signal which approximates the eccentricity of disk 1, thus achieving a coarse tracking. Object lens 10 is moved in response to a tracking error signal in real time, thus effecting minute tracking. The eccentricity of disk 1 is detected from the movement of lens 10 during the lens tracking. The sine-wave drive signal is obtained from the eccentricity of disk 1 thus detected. Due to this tracking method, the tracking control apparatus is simple in structure and can accurately control the tracking of disk 1.

The count preset to counter 195 and corresponding to the phase difference between the zero-crossing timing and the index pulse timing remains unchanged, but can be renewed when objective lens 10 is moved over many tracks, from an outer track to an inner track.

Figure 5:
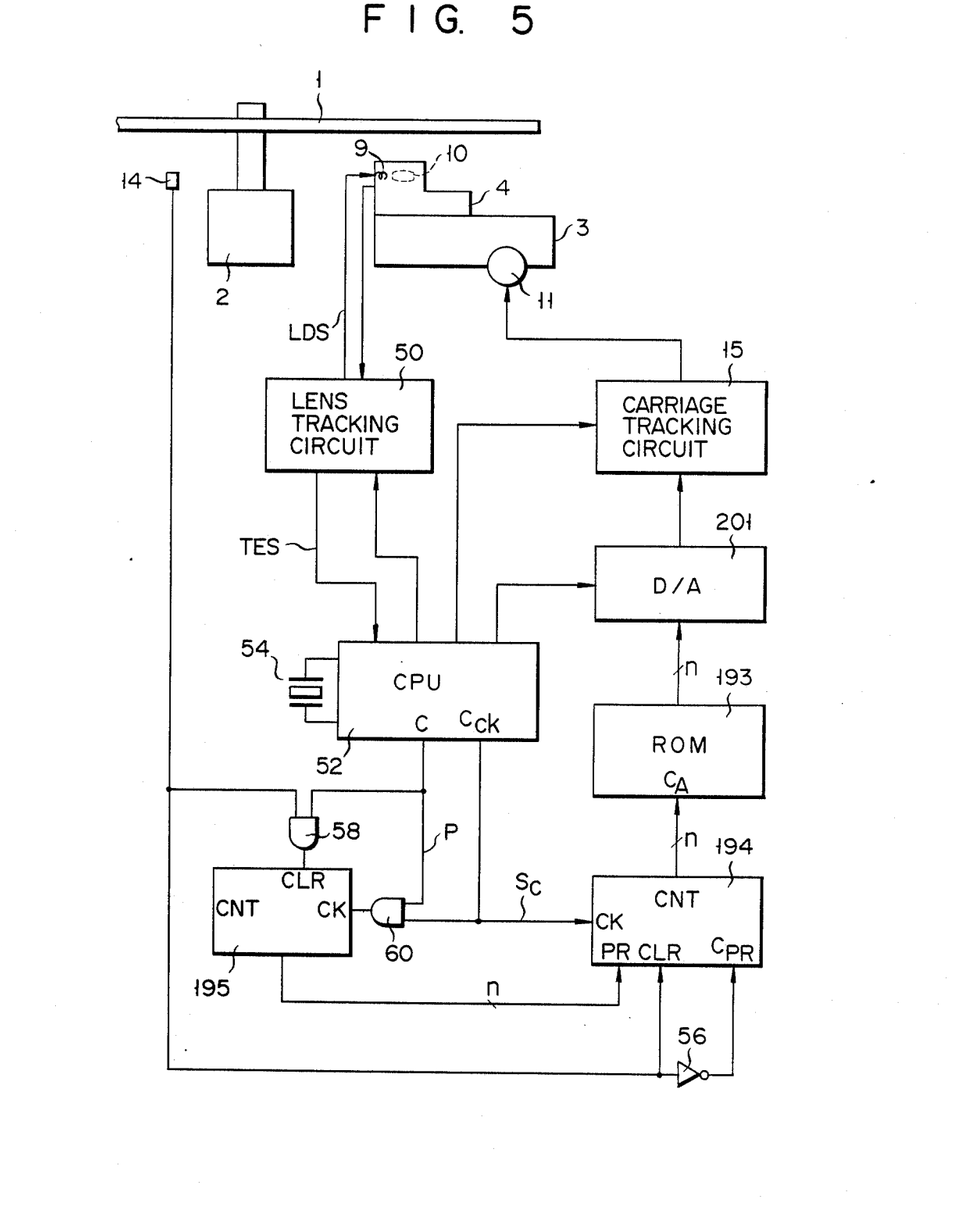
FIG. 5 is a block diagram of another tracking control apparatus according to the invention.

Another tracking control apparatus, a second embodiment of the invention, will now be described. FIG. 5 is a block diagram of the second embodiment, wherein the same numerals are used to designate the same parts or elements as used in the first embodiment.

Optical pickup 4 contains a photodetector (not shown) which generates a difference signal. The signal is input to lens tracking circuit 50 which is a combination of tracking error detector 6 and lens tracking circuit 7 both shown in FIG. 1. Circuit 50 processes the input signal and produces tracking error signal TES. It also supplies lens drive signal LDS to actuator 9 to drive objective lens 10.

Tracking error signal TES is supplied to central processing unit (CPU) 52. Quartz crystal oscillator 54 is coupled to CPU 52. The output pulses of oscillator 54 are supplied to CPU 52. CPU 52 generates clock pulses at a predetermined frequency. These clock pulses are used to achieve various controls in accordance with the program stored in a ROM (not shown). The clock pulses are frequency-divided within CPU 52, thereby forming clock pulses $S_C$. Clock pulses $S_C$ are supplied from terminal $C_{CK}$ to clock terminal CK of counter 194. CPU 52 also generates a single pulse P in response to signal TES and supplies pulse P from terminal C.

Counter 194 counts clock pulses $S_C$ and supplies its count (an n-bit digital signal) to address terminal $C_A$ of ROM 193 storing the data for compensating the eccentricity of optical disk 1. An index pulse is supplied from index detector 14 to clear terminal CLR of counter 194, clearing counter 194. The index pulse is also supplied to preset control terminal $C_{PR}$ of counter 194. The potential at terminal $C_{PR}$ falls to low level a short time after counter 194 has been cleared. The count of counter 195 supplied to preset terminal PR of counter 194 is then preset to counter 194.

Pulse P and index pulse are supplied to AND gate 58 the output of which is input to clear terminal CLR of counter 195. Pulse P and clock pulse $S_C$ are supplied to AND gate 60, the output of which is input to clock terminal CK of counter 195.

The output of ROM 193 is supplied to D/A converter 201 whose multiplier is changed by CPU 52. The output of converter 201 is fed to carriage tracking circuit 15.

Figure 6A:
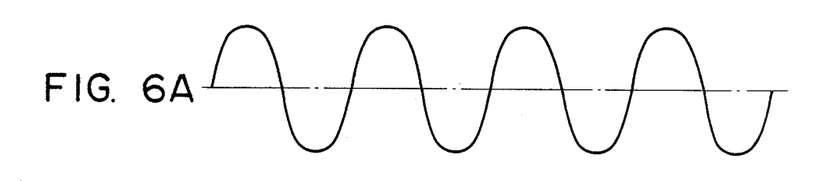

The operation of the second embodiment will be explained with reference to FIGS. 6A–6G. This embodiment also performs the lens tracking prior to two-stage servo tracking. Lens drive signal LDS is supplied to actuator 9 to perform the lens tracking. AS shown in FIG. 6A, signal LDS is a sine-wave signal approximating the eccentricity of optical disk 1. One cycle of the sine-wave signal is equal to the period disk 1 requires to rotate through 360°.

Figure 6B:
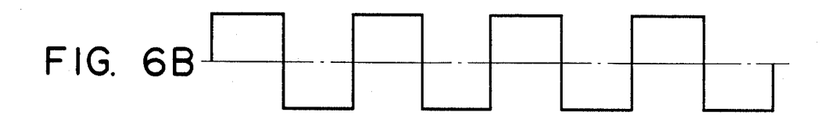
Figure 6C:
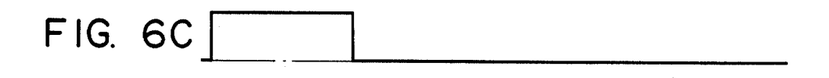
Figure 6D:
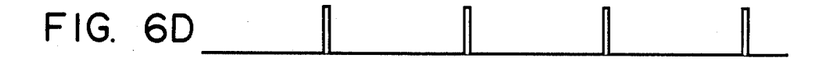
Figure 6E:
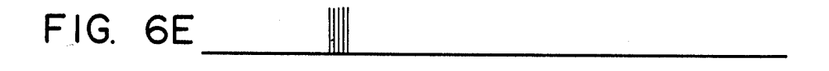
Figure 6F:
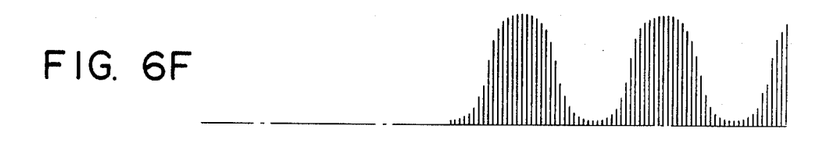
Figure 6G:
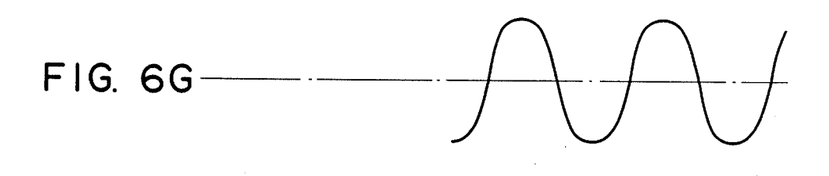

The quantized data is read out of ROM 193 in response to the sine-wave signal to drive carriage drive mechanism 11 to move carriage 3. The data must be synchronous with the lens drive signal LDS (FIG. 6A), as shown in FIG. 6F. D/A converter 201 converts the data to analog data and then multiplies the analog data by the multiplier controlled by CPU 52. The multiplier is such that the maximum moving distance of the carriage is equal to the maximum deviation of the eccentricity of disk 1. The multiplier can be controlled by changing the gain of the amplifier (not shown) provided within carriage tracking circuit 15. Therefore, carriage drive mechanism 11 is driven by the sine-wave signal having an analog value corresponding to the lens drive signal LDS supplied to actuator 9.

CPU 52 includes means for synchronizing the rotation of disk 1 with the phase of the output data of ROM 193 in the following manner. First, tracking error signal TES is wave-shaped, forming the rectangle-wave signal (FIG. 6B). The signal is frequency-divided, forming the single pulse P shown in FIG. 6C. Pulse P has a width twice greater than that of the signal of FIG. 6B; its duration is one-cycle period of the signal of FIG. 6B. Pulse P is output from clock terminal C of CPU 52. While pulse P is being generated, counter 195 is cleared by the index pulse shown in FIG. 6D, and starts counting clock pulses $S_C$ (FIG. 6E) supplied to clock terminal CK. Counter 195 stops counting pulses $S_C$ at the trailing edge of pulse P. Once pulse P has fallen to low level, counter 195 is not cleared, and no clock pulses $S_C$ are supplied to counter 195. Counter 195, therefore, maintains its count. The count of counter 195 represents the period between the time the eccentricity of disk 1 is 0 and the time the index pulse is generated. The count is preset to counter 194 every time an index pulse is generated thereafter.

The count of counter 194 increases by the clock pulse $S_C$, thereby designating the consecutive addresses of ROM 193 one after another. Hence, the sine-wave data shown in FIG. 6F is read from ROM 193. This data represents a sine wave whose phase advances by the count preset to counter 194. As a result, D/A converter 201 generates the carriage drive signal shown in FIG. 6G, which is synchronous with the rotation of disk 1 and whose amplitude corresponds to the eccentricity of disk 1.

In the second embodiment, the clock pulse of CPU 52 is used as the clock pulse $C_P$ for detecting the rotation of disk 1. No circuits are, therefore, required to generate pulse P. This simplifies the apparatus and reduces the size and manufacture cost of the apparatus.

The first and second embodiments are rather close-loop control systems. However, the second embodiment can perform open-loop control if the signals obtained by frequency-dividing the signal of FIG. 6B is used in place of single pulse P. More specifically, such signals repeatedly clear counter 195, thereby repeatedly detecting the period between the time the eccentricity of disk 1 is 0 and the time the index pulse is produced, and the preset count of counter 194 is renewed every time said period is detected.

The present invention is not limited to the embodiments described above. Various changes and modifications can be made within the scope of the invention. In the first embodiment, for example, the output of ROM 193 can be supplied to carriage tracking circuit 15 without supplying to adder 202. Further, any other periodic signal than the sine-wave signal can be used to approximate the eccentricity of disk 1. Further, the means for providing the sine-wave signal is not limited to a memory. Instead of moving objective lens 10, the mirror provided in the optical path of optical pickup 4 can be moved. Still further, disk 1 can be replaced by a card like medium. Clock pulses 200 and clock pulses $S_C$ used in the first and second embodiments to designate the addresses of ROM 193 can be used as the other clock pulses used in the apparatus. Furthermore, the recording medium can be rotated at different speeds, depending on the position of the track which is being scanned by the laser beam. If this is the case, clock pulses 200 and clock pulses $S_C$ are generated at variable frequency.

As mentioned above, the present invention can provide a tracking control apparatus which has a simple structure and in which a periodic signal approximating the eccentricity of a recording medium is read from a memory in synchronism with the rotation of the recording medium and is then amplified in accordance with the eccentricity of the recording medium detected from the movement of an objective lens, thereby achieving carriage tracking.

What is claimed is:

1. A tracking control appartaus, comprising:
   pickup means arranged for movement in a radial direction relative to a recording medium having concentric tracks or a spiral track, for recording or reproducing data in said tracks while the recording medium spins;
   first signal generating means for generating a periodic signal corresponding to rotation of the recording medium;
   second signal generating means associated with said pickup means for generating a signal representing an eccentricity of a track of the recording medium relative to the center of rotation of the medium when spinning;
   control means for controlling a phase of the periodic signal output from the first signal generating means in accordance with the output signal of the second signal generating means, and for generating a corresponding periodic drive signal; and
   tracking means for controlling tracking of the recording medium, including means for moving said pickup means in said radial direction in accordance with the periodic drive signal having a phase controlled by the control means.

2. A tracking control apparatus according to claim 1, in which said first signal generating means is a sine-wave generating means.

3. A tracking control apparatus according to claim 1, in which said control means comprises means for amplifying the periodic signal in accordance with the signal output by said second signal generating means.

4. A tracking control apparatus, comprising
   pickup means for periodically tracking a track of a recording medium and being movable to cross the track at right angles for tracking;
   actuator means for finely moving said pickup means relative to said track for accurate tracking;
   first signal generating means for generating a periodic signal the cyle period of which coincides with that of the movement of said actuator means;
   second siganl generating means for generating a signal representing an eccentricity of a track of the recording medium relative to a certain travel path;
   control means for controlling a phase of the periodic signal output from the first signal generating means in accordance with the output signal of the second signal generating means, and for generating a corresponding periodic drive signal; and
   tracking means for moving said pickup means in the direction crossing the track at right angles, in accordance with the periodic drive signal having a phase controlled by the control means.

5. A tracking control apparatus according to claim 4, in which said first signal generating means is a sine-wave signal generating means, and said second signal generating means generates a signal representing the movement of said actuator means, when said tracking means maintain said pickup means stationary.

6. A tracking control apparatus according to claim 5, in which said first signal generating means is an equivalent circuit to which a drive signal for driving said actuator means is supplied and which has the same frequency characteristic as that of said actuator means.

7. A tracking control apparatus according to claim 6, in which said equivalent circuit is a low-pass filter.

8. A tracking control apparatus according to claim 4, in which said control means comprises means for amplifying the periodic signal in accordance with the signal output by said second signal generating means.

9. An apparatus for controlling the tracking of an optical disk, comprising:
   optical pickup means capable of moving in the radial direction of the optical disk to apply a laser beam to the concentric tracks or spiral track of the optical disk;
   first tracking means provided within said optical pickup for moving the source of the laser beam in the radial direction of the disk;
   second tracking means for moving said optical pickup in the radial direction of the disk;
   first signal generating means for generating a periodic signal the cycle period of which coincides with that of the rotation of the optical disk;
   second signal generating means for generating a signal representing the eccentricity of the optical disk, in accordance with the distance by which said first tracking means moves when said second tracking means remains stationary;
   control means for controlling the phase of the periodic signal output from the first signal generating means in accordance with the output signal of the second signal generating means; and
   tracking means for moving said second tracking means in accordance with the periodic signal whose phase has been controlled by the control means.

10. An apparatus according to claim 9, in which said first signal generating means is a sine-wave generating means, and said control means comprises means for amplifying the periodic signal in accordance with the signal output by said second signal generating means.

* * * * *